Figure 1:
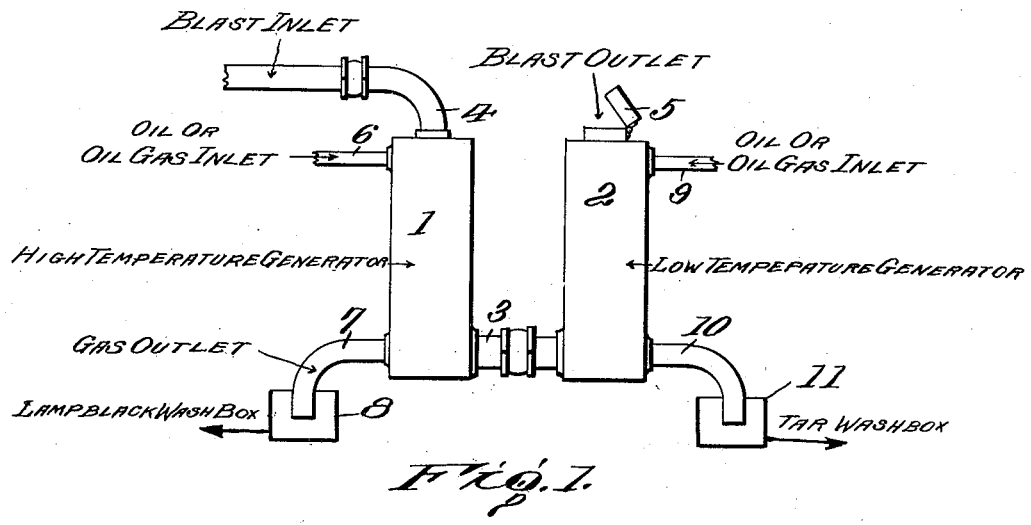

Aug. 28, 1923.

E. L. HALL 1,466,648

GAS MAKING

Filed March 7, 1921

Inventor
Elmon L Hall
By K P McElroy
Attorney

Patented Aug. 28, 1923.

1,466,648

UNITED STATES PATENT OFFICE.

ELMON LAWRENCE HALL, OF PORTLAND, OREGON, ASSIGNOR OF ONE-HALF TO HILMAR PAPST, OF PORTLAND, OREGON.

GAS MAKING.

Application filed March 7, 1921. Serial No. 450,124.

*To all whom it may concern:*

Be it known that I, ELMON LAWRENCE HALL, a citizen of the United States, residing at Portland, in the county of Multnomah and State of Oregon, have invented certain new and useful Improvements in Gas Making, of which the following is a specification.

This invention relates to gas making; and it consists of a methodical process of making city gas of standard calorific value, from petroleum oils without destroying, as in existing known processes, the valuable tarry hydrocarbons, including the light oils suitable for motor fuel, and of recovering the same, together with other valuable by-products, so as to produce a total yield of products per unit of oil three or four times greater in aggregate commercial and economic sales than by existing methods, wherein separate portions of oil are cracked into gas at different temperatures and under different conditions, blending the gas so produced and separately recovering the various by-products; all as more fully hereinafter set forth and as claimed.

In the manufacture of gas from oil by heat, the results vary materially with conditions of time and temperature; but, in a general way, at temperatures around 700° C. oils break up fairly smoothly with a maximum production of gas rich in carbon (containing ethylene, ethane, propylene, propane, etc.) and with a minimum production of condensible tarry products. These tarry products, like the gas, are of a paraffin or petroleum character. There is little free hydrogen or methane in the gas. With a prolonged exposure to heat and more quickly as the temperature goes up above 700° C., these primary products yield secondary products. At about 800°–850° C. hydrogen is split off from the gas and methane is formed, with production of tarry and oily hydrocarbons of the aromatic or benzene series. In oil gas exposed to very high temperatures, around and above 1000° C., the secondary decompositions are more fargoing, with production of free hydrogen and free carbon (lamp black). Methane, $CH_4$, which is one of the most stable of the hydrocarbons, at about 1000° C. is nearly completely (96 per cent) broken up into hydrogen and free carbon. These facts are taken into consideration in the present invention.

City gas is always required of a definite calorific value; generally somewhere between 500 and 600 B. T. U. per cubic foot. In making city gas from oil it is desirable to obtain a product of this standard richness and at the same time to obtain a good yield of high grade by-products (tar or lamp black), in order to aid in defraying the cost of manufacture. Where tar and aromatic hydrocarbons (benzene, toluene, etc.) are to be produced as by-products, it is desirable that the fixing or heating of the oil gas be at a temperature low enough to give a thin rich tar but high enough to insure absence of petroleum hydrocarbons, since the presence of a small amount of oils of the character of gasoline or kerosene much reduces the value of benzene and toluene. These results can be obtained by a cracking operation finishing around 850° to 900° C.; the particular temperature desirable varying with the time allowed for its action. To some extent, time and temperature are reciprocal factors. On the other hand, in making lamp black of good commercial quality, a considerably higher range of temperature, around and above 1000° C., is desirable for fixing. When lamp black is made, very little tar is produced and this is a pitchy material of little merchantable value. In making city gas at the optimum temperature for the production of high grade tar, the gas is rather richer than is desirable for standard gas; that is, it runs more than 600 B. T. U. per cubic foot. On the other hand, at the optimum temperature for making lamp black of good commercial grade, the gas produced is materially below the standard; that is, it is below the minimum of 500 B. T. U. per cubic foot. If the attempt be made, as it sometimes is, to directly make gas of standard richness, the quality of the by-products suffers; there is neither a production of high grade tar nor of high grade lamp black.

In the present invention, I meet these difficulties by making two grades of gas separately and afterwards blending or mixing them to produce the standard richness of gas; one portion of gas, the richer, being made under the optimum conditions for the production of high grade tar and the other portion being made under the optimum conditions for making good lamp black. In so doing, I accomplish the desired result of a maximum value of by-products with the production of standard city gas. The legal requirements as regards the calorific value of city gas vary in different cities, but they are usually between the stated limits of 500 and 600 B. T. U. per cubic foot. The present process may be so conducted as to attain any particular richness desired within these limits.

In making oil gas, the oil is usually first given a gas-making cracking treatment in retorts or checkers maintained at about a red heat and the oil gas is then fixed in checkers of refractory material; these checkers being alternately heated by combustion therein and used to deliver heat to the oil gas. In one embodiment of my invention, my ends may be readily accomplished by firing or heating a pair of checkers in series. In so doing, the first checker in which combustion takes place is heated to a considerably higher temperature than the second; and the first checker may then be used for producing lean gas and lamp black, while the second checker is used for producing rich gas and tar. Generally, however, I use separately operated sets of checkers for the two operations.

In the accompanying illustration I have shown, more or less diagrammatically, apparatus susceptible of use in performing the described method of making standard gas and high grade by-products.

Figure 2:
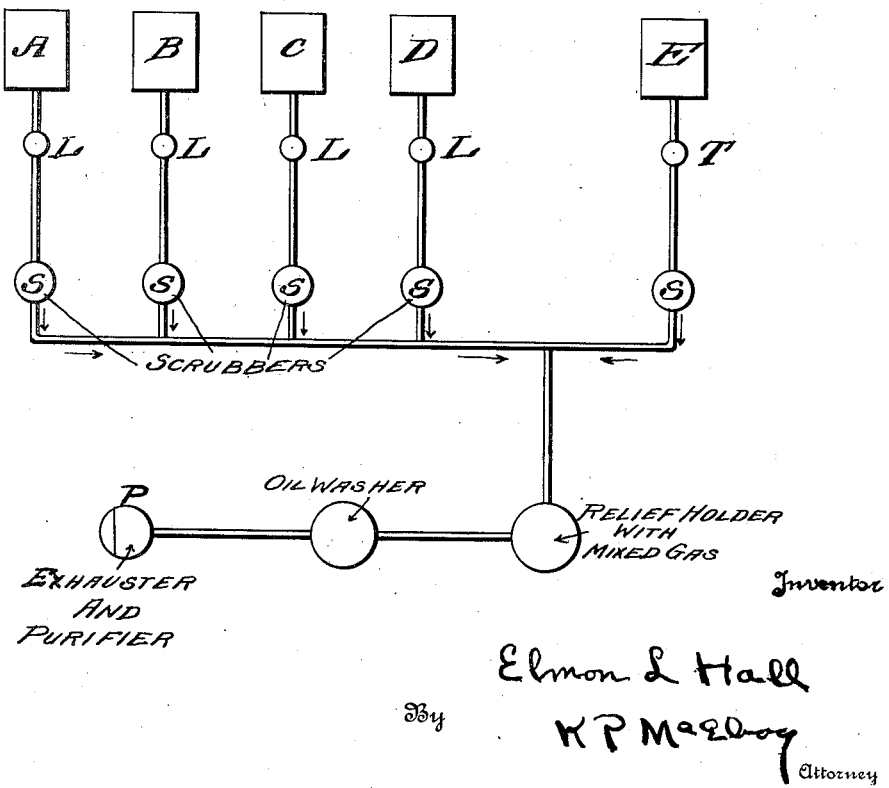

In this showing, Fig. 1 is a diagrammatic view in elevation of a pair of connected checkers operating in series as regards firing and in parallel as regards gas-making, and Fig. 2 is a diagrammatic showing in the nature of a flow sheet of an installation of apparatus for separately making the two grades of gas stated.

In the showing of Fig. 1, elements 1 and 2 are a pair of checker chambers connected at their base by valved connection 3. At the top of the checker chamber 1 is a blast inlet 4 and at the top of the other checker chamber 2 is blast outlet 5. At the top of checker chamber 1 is oil or oil gas inlet 6 and at its base is gas outlet 7, leading through seal 8 to lamp black washers, purifiers, etc., not shown. At the top of the second or lower temperature checker is oil or oil gas inlet 9 and at its base is outlet 10 leading through seal pot 11 to tar washers, scrubbers, purifiers, etc., not shown.

In the operation of the device of Fig. 1, air or a blast of hot products of combustion coming from suitable firing means (not shown) is led into and through the two checkers in series, entering at 4 and discharging at 5. When firing is complete, blast outlet 5 is closed and communication between the checkers at 3 is interrupted. The firing results in heating the first checker to a much higher temperature than the second. Any suitable mineral oil may be sprayed in at 6 or alternatively I preliminarily gasify the oil at about a red heat (600–700° C.), using any suitable apparatus, such as externally heated checkers, retorts, etc., and lead in the oil gas at 6. Oil sprayed in is at once gasified producing oil gas, but as this consumes heat, it is often better to do as stated, preliminarily gasifying the oil elsewhere. The oil or oil gas passing through 1 is gasified at a very high temperature, 1000° C. or more, with production of lamp black and a lean gas, usually of about 450 B. T. U. This gas consists mainly of hydrogen, and the carbon of the oil gas is practically entirely delivered as lamp black. In a similar way, oil or oil gas is led into the second checker through 9 and is gasified or fixed at a lower tar-forming temperature, say, around 850–900° C., with production of large amounts of high grade tar and of a gas which, after scrubbing free of benzene and the like, will have a thermal value of about 1100 B. T. U. per cubic foot. The two grades of gas, after purification, scrubbing, removing volatile oils, etc., are mingled in the proportions to give a gas of the particular standard richness desired.

As the gas fixed at the comparatively low optimum temperature for the production of high grade tar is quite rich, being much above the stated standard strength, it is usually desirable to have the high temperature fixing, or lamp black making, devices greater in number or of more capacity than the low temperature devices. Such an arrangement is shown in Fig. 2. In this showing, elements A, B, C and D are four high temperature fixing chambers, while E is a low temperature fixer or tar producing device. A, B, C, and D are run in parallel to produce lamp black and a gas of, say 450 B. T. U. The gas and lamp black pass through the lamp black recovery devices indicated diagrammatically and marked L, the gas going thence to scrubbers S, and finally to a relief holder, so marked. The tar producing fixer E usually gives a gas of a richness around 1100 B. T. U. With the particular installation shown and with A, B, C, D, and E, all of about the same fixing capacity, a gas of about 580 B. T. U. per cubic foot (after scrubbing) will be collected in the relief holder. The gas and tar produced in E go through tar recovery apparatus marked T and a scrubber S. The rich gas of, say, 1100 B. T. U. finally goes to the relief holder as shown by the arrow. The mixed or blended gases in the relief holder shown carry vapors of benzene, toluene, naphthalene, etc., raising the apparent calorific value of the blended gas above (580 B. T. U.), but these vapors are recovered in a diagrammatically shown apparatus marked "Oil washer," thereby reducing the calorific value of the gas to the standard desired. From the oil washer, the standard gas goes, as shown by the arrow, to ordinary exhausters and purifiers, designated as a whole by P.

The final gas produced is freed from hydrogen bisulfid and other impurities in the usual ways.

In the various operations, pressure greater or less than atmospheric may be used, but working at the ordinary pressure, or merely enough above the same to allow movement of gases, does sufficiently well. The present process may be applied to any of the petroleum oils or distillates, such as crude oil, topped oils, solar oil, gas oil, still residua, etc.

In the operation producing rich gas, tar and by-products, where benzene and toluene are to be used for chemical purposes, the temperature limits in the cracking operation should be about the range stated, that is, between 850° and 900° C., as for these purposes the absence of petroleum hydrocarbons is a desideratum; but where, as sometimes happens, the volatile oils are to be used for motor purposes, fuel, etc., a somewhat lower temperature in cracking to make rich gas is permissible.

What I claim is:—

1. In the manufacture of standard city gas from oil with the production of valuable by-products, the process which comprises fixing oil gas at a temperature adapted to produce rich gas and thin tar, fixing another portion of oil gas at a temperature of 1000° C. or higher to produce lean gas and lamp black, and blending the rich gas and the lean gas to make an average gas between 500 and 600 B. T. U. per cubic foot.

2. In the manufacture of standard city gas from oil with production of valuable by-products, the process which comprises passing oil gas through different checkers operating in parallel and of different temperatures, one such checker being at a temperature below 900° C. and another such checker being at a temperature of 1000° C. or higher, collecting and removing tar from the effluent gas from the first checker, collecting and removing lamp black from the effluent gas coming from the second checker, and blending the gas from the two checkers in such proportions as to give an average gas with a calorific value between 500 and 600 B. T. U. per cubic foot.

In testimony whereof, I have hereunto affixed my signature.

ELMON LAWRENCE HALL.